United States Patent [19]
Dunn et al.

[11] Patent Number: 5,757,016
[45] Date of Patent: May 26, 1998

[54] ABLATIVE FLASHLAMP IMAGING

[75] Inventors: Douglas S. Dunn, Maplewood; Jeffrey B. Hill, Stillwater; Andrew J. Ouderkirk, Woodbury, all of Minn.

[73] Assignee: Minnesota Mining and Manufacturing Company, St. Paul, Minn.

[21] Appl. No.: 418,134

[22] Filed: Apr. 7, 1995

Related U.S. Application Data

[63] Continuation of Ser. No. 169,168, Dec. 17, 1993, abandoned.

[51] Int. Cl.$^6$ ............................................. H01J 37/00
[52] U.S. Cl. ............................... 250/492.1; 250/492.21
[58] Field of Search .......................... 250/316.1, 492.1, 250/492.2, 492.21, 492.22; 430/496, 523, 346, 964

[56] References Cited

U.S. PATENT DOCUMENTS

| | | | |
|---|---|---|---|
| 3,480,965 | 11/1969 | Zoppoth et al. | 346/76 |
| 3,547,629 | 12/1970 | Kinney et al. | 96/27 |
| 4,032,743 | 6/1977 | Erbach et al. | 219/121 |
| 4,074,276 | 2/1978 | Haas et al. | 364/746.1 |
| 4,211,838 | 7/1980 | Izu et al. | 250/316.1 |
| 4,323,755 | 4/1982 | Nierenberg | 219/121 |
| 4,421,839 | 12/1983 | Takiguchi et al. | 250/316.1 |
| 4,436,985 | 3/1984 | Weber | 250/492.1 |
| 4,515,867 | 5/1985 | Bleacher et al. | 428/204 |
| 4,516,195 | 5/1985 | Gonser | 250/493.1 |
| 4,529,991 | 7/1985 | Wada et al. | 346/76 |
| 4,764,707 | 8/1988 | Cheng | 313/580 |
| 4,822,451 | 4/1989 | Ouderkirk et al. | 156/643 |
| 4,868,006 | 9/1989 | Yorkgitis et al. | 427/53.1 |
| 4,877,480 | 10/1989 | Das | 156/635 |
| 4,879,176 | 11/1989 | Ouderkirk et al. | 428/323 |
| 5,028,292 | 7/1991 | Incremona et al. | 156/272.6 |
| 5,061,604 | 10/1991 | Ouderkirk et al. | 430/296 |
| 5,166,186 | 11/1992 | Kojime et al. | 522/37 |
| 5,178,726 | 1/1993 | Yu et al. | 156/643 |
| 5,204,517 | 4/1993 | Cates et al. | 250/205 |

FOREIGN PATENT DOCUMENTS 26 16 362  11/1977  Germany.

OTHER PUBLICATIONS

J.R. Lankard and G. Wolbold, "Excimer Laser Ablation of Polyimide in a Manufacturing Facility", *Applied Physics*, A54, pp. 355–359 (1992).

U. Sowada, H.J. Kahlert and D. Basting, "Excimer Laser Processing of Thin Metallic Films on Dielectric Substrates", *SPIE*, vol. 801, High Power Lasers, pp. 163–166 (1987).

M. Gauthier et al., "Excimer Laser Thin Metallic Film Patterning on Polyvinyledene Difluoride," 129 *Materials Research Society Symposium Proceedings*, 399–404 (1989).

*Primary Examiner*—Jack I. Berman
*Assistant Examiner*—Kiet T. Nguyen
*Attorney, Agent, or Firm*—Gary L. Griswold; Walter N. Kirn; Carole Truesdale

[57] ABSTRACT

The present invention includes a method of creating a shaped image in a workpiece using a flashlamp, the method comprising positioning a template proximate the workpiece and directing radiation emitted by the flashlamp during a short pulse of less than approximately 100 µsec through the template toward the workpiece.

29 Claims, 3 Drawing Sheets

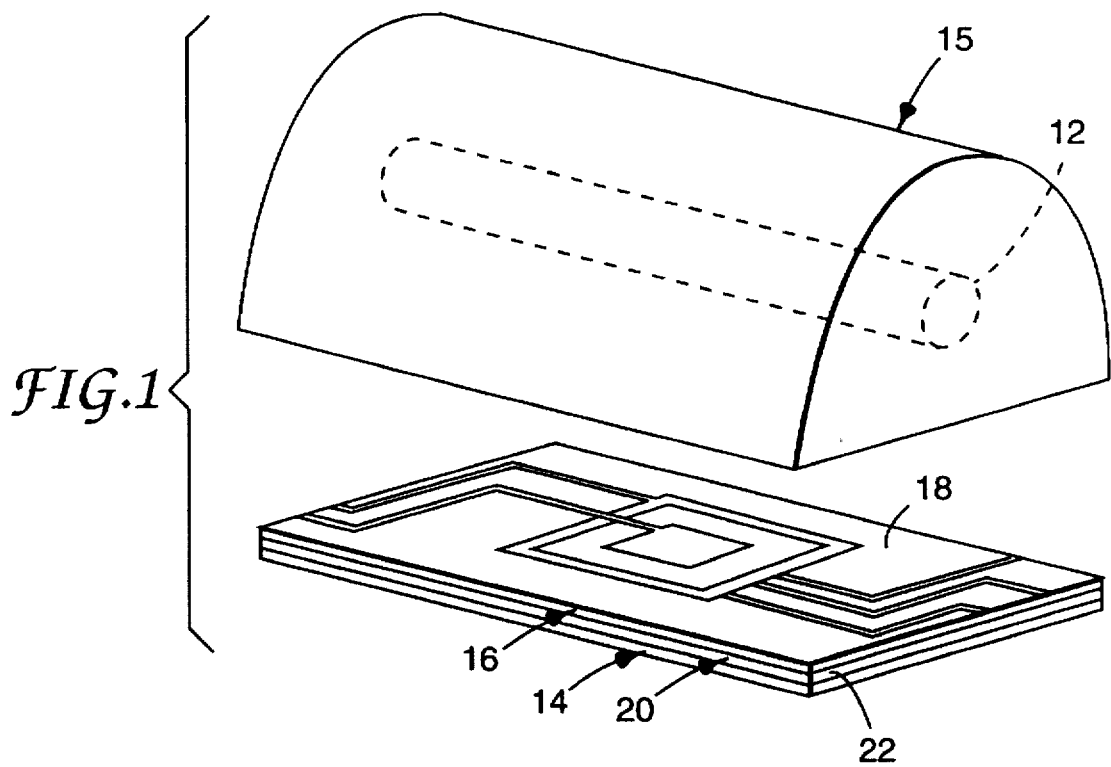
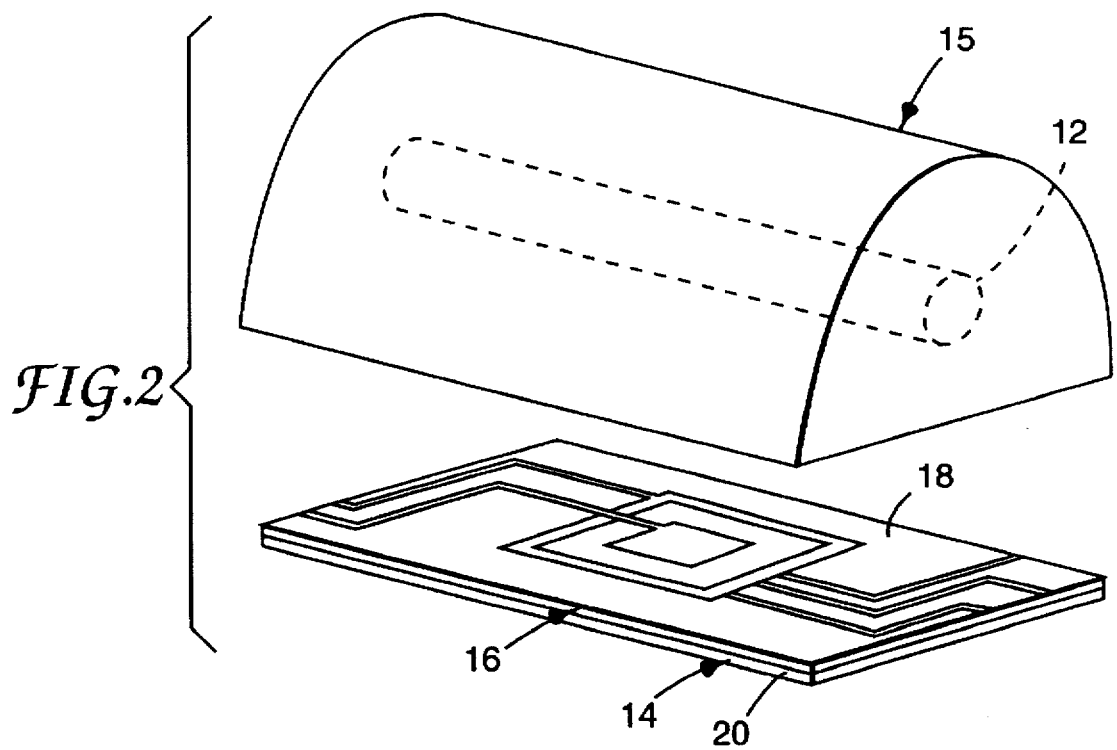

ABLATIVE FLASHLAMP IMAGING

This is a continuation of application Ser. No. 08/169,168 filed Dec. 17, 1993, now abandoned.

BACKGROUND OF THE INVENTION

The present invention generally relates to a method of creating a shaped image in a workpiece. More specifically, the present invention relates to a method of creating a shaped image in a workpiece using a pulsed radiation in combination with a template.

Techniques for forming a shaped image in a workpiece are many. Such techniques are widely used in the manufacture of many types of electronic devices, such as magnetic disks, memory card circuits and flexible circuits. Related techniques are also employed to mark various devices with information such as bar-codes, to create printing elements such as lithographic plates, and to generate ornamental designs.

Stamping is one technique for creating a shaped image in a workpiece. For example, presses with stamping dies create optically readable servo stitches in magnetic disks. One problem with the stamping technique is that stamping dies have relatively short life spans. Also, the elastic nature of the disks causes changes in the geometry of stamped stitches over time.

Chemical etching is another technique for creating a shaped image in a workpiece. In this technique, photoresist is applied to a substrate and patterned in a known manner. Developed portions of the resist are then removed by chemical etching to leave the shaped image. The chemicals that perform the etch are not entirely beneficial. For instance, the chemicals tend to undercut undeveloped portions of the workpiece. This undercutting limits the size and location of the shaped image which can be formed in the workpiece.

Other well-known processes for creating a shaped image in a workpiece include electron-beam, ion beam, corona, and plasma treatment. These methods are either continuous or long pulse length etching processes which, due to their low energy flux, yield a low heat transfer rate. The low heat transfer rates are detrimental when etching surface coatings such as polymer-based coatings. Specifically, the low heat transfer rates create an undesirable thermal treatment effect in areas of the coating other than the etched areas.

Laser-based techniques are also useful for creating a shaped image in a workpiece. One technique utilizes an Argon/Ion laser to directly burn optically-readable servo stitches one by one into magnetic disks. The laser beam is optically switched on and off while the disk is spinning and a final lens objective is translated. Another technique concerns a method of producing a machine readable coded marking in a surface of a workpiece, such as a glass faceplate panel of a television picture tube, by vaporizing parallel areas of similar width in the panel surface using a carbon dioxide laser.

A technique for directly marking a glass funnel of a television picture tube by ablating image features into a pigmented inorganic coating placed on the funnel is also known. Additionally, patterning of metal coatings of polymer substrates using high energy laser ablation techniques is known in the art.

Others have developed a technique for ablating patterns in metal coatings located on the front and back sides of a polymer film with an excimer laser. The laser first ablates a pattern in the coating on the front side of the polymer film in a single pulse. The laser then ablates a pattern in the coating on the rear side of the polymer film in a single pulse by passing radiation through the pattern ablated on the front side and through the film toward the coating on the rear side.

Another consideration is that, though direct formation of individual image features is sometimes beneficial for workpieces with fewer image features and for smaller batches of workpieces, direct feature formation is not always an optimum choice. For example, direct laser formation of image features, one at a time, requires much more time than if the laser operated on multiple images or image features arranged about the workpiece.

Technological advances have been developed which allow laser operation on more than one image or image feature at a time. For example, a contact lithographic technique for forming a shaped image in a workpiece, such as an alumina-coated ceramic substrate is known. According to the technique, a mask of material that is highly reflective in the wavelengths of the selected laser is placed in contact with the alumina coating. Radiation from a carbon dioxide laser is applied to the mask to remove portions of the alumina coating that are not masked. The reflective surface of the mask reflects the laser radiation away from areas of the workpiece covered by the mask.

It is also known to apply an ink pattern to a workpiece for forming a shaped image in the workpiece. Typically, the workpiece includes a metal or polymer coating on a ceramic or polymer-based substrate. The ink pattern is applied directly to the coating. Radiation from a laser, such as an excimer laser, is applied to the ink pattern to remove portions of the coating that are not covered by the ink pattern.

A projection lithography process that incorporates an excimer laser and a mask is known. The mask is positioned away from the workpiece, and radiation from the laser is directed through the mask at the workpiece to ablate vias in a polyimide coating of a multi-layer printed circuit board. The excimer laser, which is positioned about 4.2 meters from the projection optics, has a rectangular shaped output beam (1 cm×3 cm).

When flooding a mask to create a shaped image, the laser beam is preferably as large or larger than the area being ablated to insure adequate coverage of all images or image features. Output beams of lasers typically require reshaping and focusing with optics to assure that optimum beam shape and adequate energy density exist. Beams smaller than the area being ablated must be scanned over the mask and are incapable of flooding the mask.

Though lasers may be beneficial in some applications, lasers are not always the best response to pattern imaging projects. Laser imaging processes typical require sophisticated optics for shaping and translating the beam and for concentrating beam energy. Lasers, even higher powered lasers, such as excimer lasers, are not always capable of fully flooding desired image areas. Instead, complex scanning configurations are required which may decrease laser economics and productivity, as compared to flooding configurations. Laser imaging processes, especially those requiring sophisticated optics, have high equipment costs.

Also, it has been discovered that an excimer laser creates a narrow region of damaged material during ablation. Each pulse of the laser generates a separate region of damaged material. The region extends around the edges of the area ablated by the laser. In metal coatings, the damaged regions frequently include crazed metal and thickened metal, relative to the non-imaged metal coating. For polymer coatings, the damaged regions contain a large amount of surface debris. No matter the coating, damaged material is typically more difficult to fully ablate than non-damaged material. Some amount of damaged material must usually be removed to fully ablated the shaped image in the workpiece. Repeated translation of the workpiece through the laser beam to ablate the damaged material is time-consuming and may not fully ablate the damaged material.

Lasers are also problematic when used in combination with ink patterns to create a shaped image in a workpiece. Ink patterns, especially thinner ink patterns, are often somewhat porous and may have voids that extend through the ink pattern. It has been found that high resolution lasers such as excimer lasers tend to ablate pinholes in the workpiece that correspond to the voids in the ink pattern. Pinholes may cause opens if associated with certain conductive patterns, such as a conductive pattern ablated in a metal coating.

Other comments concern irradiation of a surface layer of semi-crystalline polymer with a flashlamp to render portions of the surface layer quasi-amorphous. It has been noted that the presence of the quasi-amorphous layer tends to enhance bonding of the semi-crystalline polymer to other materials generally, including adhesive materials. It has also been said that the presence of the quasi-amorphous layer reduces optical reflectance and increases optical transmission of the semi-crystalline polymer, increases coating adhesion to the semi-crystalline polymer, and reduces the coefficient of friction of the surface of the semi-crystalline polymer.

Irradiation of a surface layer of semi-crystalline polymer with a flashlamp to create an imagewise distribution of quasi-amorphous polymer within the surface layer has been mentioned. A reactive ion etching process is utilized to preferentially remove the semi-crystalline polymer after irradiation of the surface layer.

It has been disclosed that paint coatings may be removed from metal and polymer substrates using a flashlamp. The flashlamp has a relatively long pulse width ranging between 1200 and 2400 microseconds during which the energy density is in the range of 9–10 J/cm$^2$ and the wavelength of emitted radiation ranges from 170 nm to 5000 nm. The paint removal process employing the flashlamp is controlled by monitoring spectral emissions of the paint coating.

SUMMARY OF THE INVENTION

The present invention includes a method of creating a shaped image in a workpiece using a flashlamp. The method comprises positioning a template proximate the workpiece and directing radiation emitted by the flashlamp during a short pulse of less than approximately 100 μsec through the template toward the workpiece. The present invention also includes a method of creating a shaped image in a workpiece using a broadband light source that emits radiation during a short pulse of less than approximately 100 μsec. The present invention further includes a system for creating a shaped image in a workpiece using a flashlamp that emits radiation during a short pulse of less than approximately 100 μsec.

BRIEF DESCRIPTION OF THE DRAWINGS

FIG. 1 is a perspective view of the system of the present invention.

FIG. 2 is a perspective view of another embodiment of the system of the present invention.

DETAILED DESCRIPTION OF THE PREFERRED EMBODIMENTS

Figure 3:
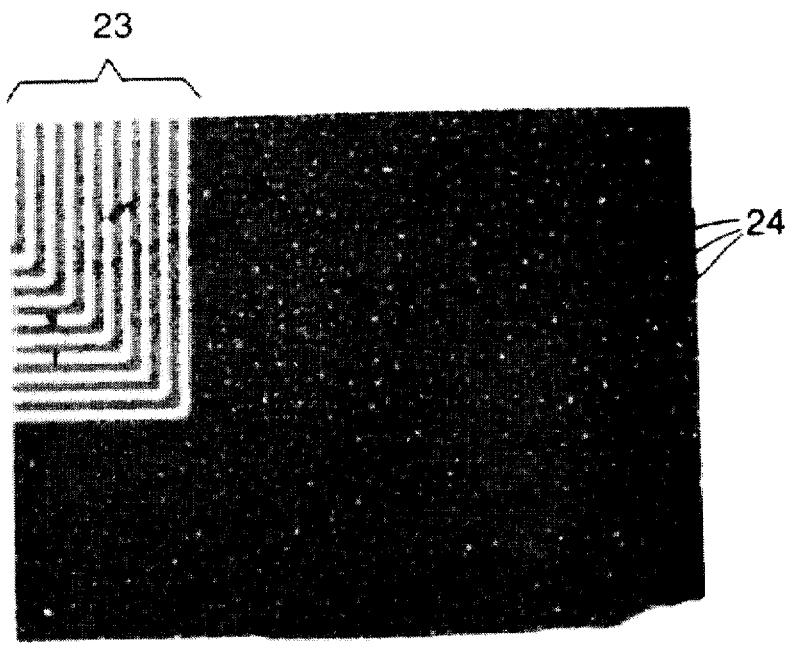
FIG. 3 is a magnified top plan view of a pattern imaged by the flashlamp in accordance with the present invention.

The present invention includes a method of creating a shaped image in a workpiece using a short pulse flashlamp and a system for creating a shaped image in a workpiece with a short pulse flashlamp.

In accordance with the method and system of the present invention, broadband radiation from a short pulse light source, preferably a flashlamp 12 as in FIG. 1, is directed at a workpiece 14 to form a shaped image, such as a three dimensional pattern 13, in the workpiece 14. A reflector 15 is placed over the flashlamp 12 to guide the radiation, at a selected energy density, toward the workpiece 14. A template 16, such as a mask 18 with a guide shape, is positioned proximate the workpiece 14 to cast radiation onto the workpiece 14 in the shape of the pattern 13.

Workpieces 14 of particular interest include a substrate (not shown). One or more sides of the substrate may include a coating (not shown). If the substrate does not include the coating, the substrate includes a boundary portion (not shown) instead of the coating. The pattern 13 is preferably created in the coating, if the substrate includes the coating, or in the boundary portion, if the substrate does not include the coating.

The substrate may be made of many organic or inorganic materials, including silicon, metal, composite materials that are impregnated with fibers such as carbon and glass, or polymers, such as polyester, polycarbonate, polyethylene, polyethylene terephthalate, polyamide, or polyimide. The substrate may be flexible or rigid in structure. The boundary portion is preferably made of the same material as the substrate. The coating includes a surface coating layer and may include one or more additional coating layers. The coating layers may be arranged in any desired order. The pattern 13 may be formed in any of the coating layers, as desired, so long as the desired coating layer is visible to a sufficient amount of radiation to form the pattern 13. Preferably, the coating layer in which the pattern 13 is formed is less than about 1 μm thick.

Organic and inorganic materials may be included in the coating layers to provide desired operative, structural, identifying, and aesthetic features. For instance, one or more of the coating layers may be made of a conductive metal to provide desired conductive characteristics. Examples of conductive metals of interest include copper, silver, nickel, chromium, alloys of these, and indium tin oxide. Also, one or more of the coating layers may be made of a magnetic metal to provide desired magnetic characteristics. The magnetic metal, for purposes of this disclosure, is an elemental metal or a metallic compound that possesses magnetic properties. The magnetic metal may be the sole component of a particular coating layer or may be a single component of several components making up the particular coating layer, such as magnetic particles distributed within the particular coating layer. Examples of magnetic metals include iron, iron oxide, barium ferrite, cobalt nickel, cobalt phosphorous, cobalt chrome, and oxides of cobalt.

Examples of potential workpieces include substrates coated with magnetic metal or magnetic material, such as magnetic data storage disks, sometimes referred to as floppy disks. Other examples of potential workpieces include substrates coated with conductive metal, such as memory card circuits and touch screen circuits. Additional examples of potential workpieces include polymer-coated substrates, such as objects on which bar code information is placed.

The short pulse light source, preferably the flashlamp 12, selectively patterns the coating or boundary portion of the workpiece 14 by a well known process called ablative decomposition, hereinafter referred to as ablation. Ablative formation of the pattern 13 depends upon a substantial level of absorption of short pulse width, high density energy in the coating or boundary portion. Absorption of short pulse width, high density energy is known to generate a substantial amount of heat in the coating or boundary portion in a very short time period such that the generated heat stays in the coating or boundary portion during the short time increments of the pattern ablation process. The short pulse length, high density energy is believed to concentrate in the coating or boundary portion proximate the pattern 13, rather than bleeding into areas of the workpiece 14 away from the pattern 13 or into areas of the workpiece 14 other than the coating or the boundary portion.

Favorable pattern ablation conditions include energy densities greater than or equal to approximately 0.5 J/cm$^2$ generated during a pulse width of less than about one hundred microseconds (100 μsec). Lower density (less than approximately 0.5 J/cm$^2$), longer pulse width (greater than approximately 100 μsec) energy is not believed to fully concentrate in the coating or boundary portion proximate the pattern 13, but instead is thought to cause undesirable thermal effects in areas of the workpiece 14 located away from the pattern 13. Preferably, the broadband radiation of the flashlamp 12 has high energy density (greater than approximately 1.5 joules/centimeter$^2$) that is achieved during a short pulse width (less than about 100 μsec) to assure satisfactory ablative imaging of the pattern 13 in the coating or the boundary portion of the workpiece 14.

The range and distribution of the radiation wavelengths is also relevant to selection of the light source, preferably the flashlamp 12. This wavelength information is considered in combination with substrate and coating characteristics, such as composition and thickness. Coatings and boundary portions associated with different workpieces 14 absorb different wavelengths of radiation at different rates, depending upon many variables, such as workpiece 14 composition, coating composition and thickness, and energy density of the radiation. Since desirable ablation characteristics depend upon rapid absorption of radiation energy, selection of radiation wavelengths which are quickly absorbed by the coating or boundary portion of the workpiece 14 typically improves pattern ablation. For example, it has been found that, for some substrates and coatings, concentration of the radiation in the shorter wavelengths, less than approximately 800 nm, improves ablation imaging and economic and process efficiencies associated with ablation imaging.

Absorption of the radiation may be enhanced by application of absorption enhancing agents. Absorption enhancing agents, for purposes of this disclosure, are chemical agents that are applied to the coating or boundary portion of the workpiece 14 for the purpose of enhancing absorption of radiation, preferably select wavelengths of radiation, by the coating or the boundary portion. Examples of absorption enhancing agents include certain dyes and pigments. Another example of an absorption enhancing agent is an oxide created in the surface of a metal coating. Such an oxide may offset the reflective nature of certain metals such as aluminum.

The wavelength of the radiation contacting the coating or boundary portion of the workpiece 14 may be varied to better match the wavelengths absorbed by the coating or the boundary portion in several ways. For instance, variation of power input to the flashlamp 12 typically varies the wavelength distribution and the peak wavelength of the radiation. In another technique, an optical filter (not shown) may be placed between the flashlamp 12 and the workpiece 14 such that the radiation passes through the optical filter. The optical filter may be configured to selectively screen undesired wavelength components from the radiation. Screening of undesired wavelengths also concentrates the energy density of the radiation in wavelengths of interest. Screening of undesired wavelengths may optimize ablation of the pattern 13 by reducing detrimental workpiece effects of the radiation such as heating of the workpiece.

The substrate may also be selected or modified with absorbing dyes or particles to reduce the intensity of energy reaching a coating on the backside of the substrate. Alternatively, a reflective material can be used in the substrate or as a sublayer to the backside coating to reduce the energy absorbed by the backside coating or substrate.

In one embodiment, the flashlamp 12 is preferably a linear flashlamp. The linear flashlamp is able to produce high power and energy density discharges at shorter wavelengths in relatively short pulses on the order of 5 μsec. The linear flashlamp typically includes a quartz lamp tube with a wall thickness of about 1 mm, an internal bore with a diameter in the range of about 3–20 mm, and a length of up to many centimeters. Electrodes, often made of tungsten, are sealed into the ends of the lamp tube. Also, the lamp tube is filled with a noble gas, preferably xenon for efficiency reasons.

The linear flashlamp is pulsed by quickly applying a high voltage, typically in the range of 5–40 kv, to the electrodes using a capacitor bank. The charge ionizes the xenon atoms to form a plasma that emits the radiation. The high voltage is applied to the capacitor bank at a high rate, using a fast closing dump switch to create a shortened pulse width on the order of 5 μsec. A flow of low voltage direct current on the order of a few amps, known as a simmer current, is preferably maintained through the electrodes, both during and between pulses of the flashlamp 12, to keep the plasma warm. Warming of the plasma prevents thermal shock within the flashlamp 12 when the flashlamp 12 is pulsed.

Additionally, the high density energy of the linear flashlamp is available over a relatively large area, as compared to other radiation sources, such as lasers. The large radiation coverage area coupled with the guide shape of the mask 18 sometimes allows the light source, such as the flashlamp 12 to desirably create multiple image features at a time without movement of the flashlamp 12 relative to the mask 18 or the workpiece 14.

The large radiation coverage area of flashlamps, relative to the radiation coverage area of lasers such as excimer lasers, minimizes undesirable regions of damaged material in the coating or boundary portion that is ablated. As already noted, each pulse of a laser creates a separate region of damaged material. It is believed that the damaged material associated with the laser results from diminished energy density in the coating or boundary portion proximate the perimeter of the laser beam. It is thought that the diminished energy density may be caused by beam divergence, beam jitter due to system vibration, and beam jitter caused by non-uniform laser plasma generation.

The flashlamp 12 also creates a region of damaged material in the coating or boundary portion during each pulse of the flashlamp. It is thought that the damaged material associated with the flashlamp 12 is attributable to diminished energy density in the coating or boundary portion proximate the perimeter of the radiation emitted by the flashlamp 12. It is believed that the diminished energy density associated with the flashlamp 12 may be due to thermal diffusion proximate the perimeter of the pattern that is ablated. The thermal diffusion apparently occurs due to absorption of radiation over a longer period of time than observed for the laser. The slower absorption arises because the energy density of the flashlamp is generated during a longer pulse than that of the laser.

Though the flashlamp does create damaged material, the region of damaged material of the flashlamp is less problematic than the region of damaged material of the laser. The region of damaged material generated by the laser is a significantly larger percentage of the area ablated than is the region of damaged material associated with the flashlamp. Consequently, ablation of the damaged material associated with the flashlamp requires less corrective imaging than does ablation of the damaged material associated with the laser. Consequently, the damaged material diminishes productivity of the flashlamp at a significantly lower rate than for the laser.

In accordance with the present invention, the template 16, such as the mask 18 with the guide shape, may be positioned proximate the coating or boundary portion. The guide shape of the mask 18 comprises essentially one or more shaped windows (not shown) which direct the radiation of the flashlamp 12 at the coating or boundary portion to form the pattern 13 in the workpiece 14. The workpiece 14 is located on one side of the mask 18, and the flashlamp 12 is located on the other side of the mask 12.

The mask 18 preferably includes underlying support for the window portions of the mask 18. Supported masks avoid many alignment and mask shape distortion problems. Also, supported masks are able to include isolated areas of mask material, such as an X-Y pattern or the center of the letter "O".

Preferably, the mask 18 is made of a base material with high transparency to the radiation of the flashlamp 12, such as fused silica, commonly known as synthetic quartz. High transparency of the base material, which spans the window areas of the mask, minimizes distortion and diffraction of radiation passing through the mask and minimizes heating of the mask due to absorption of radiation. The mask 18 also includes a surface coating that is highly reflective to the radiation of the flashlamp 12. High mask 18 reflectivity minimizes etching of the mask 18 in areas of the mask 18 where it is desired to block the radiation and also minimizes undesirable heating of the mask 18.

In one embodiment, the surface coating of the mask 18 is made of aluminum that is vacuum deposited on the fused silica base material to a depth of approximately 600 nm. The aluminum is shaped to form the guide shape in the mask 18 by standard semiconductor industry photolithographic and wet etch processing techniques.

As an alternative to the mask 18, the template 16 may be an ink formation (not shown) placed on or proximate the coating or boundary portion. The ink formation is substituted for the mask 18. The ink formation serves as a guide for the radiation of the flashlamp 12.

It has been found that the ink formation sometimes has voids that may cause ablation of pinholes in the coating of the workpiece. When the laser, such as the excimer laser, images the pattern in the workpiece through the ink formation having voids, high resolution pinholes may be ablated in the coating of the workpiece. However, when the flashlamp 12 images the pattern in the workpiece through the ink formation that is substantially similar to the ink formation used with the laser, a significant decrease in pinhole ablation has been observed. Both the size and number of pinholes is diminished when the flashlamp 12 ablates the pattern, as compared to when the laser ablates the pattern. Minimizing the size and number of pinholes is desirable to reduce the likelihood of opens in certain conductive patterns, such as the pattern 13 when ablated in conductive metal.

It is believed that pinhole imaging decreases for the flashlamp, relative to the laser, because of increased thermal effects in the coating that are attributed to the flashlamp. Specifically, the energy density of the flashlamp 12 is applied to the coating during a longer time period than is the energy density of the laser. Consequently, it is believed that thermal energy generated in the coating by the flashlamp diffuses away from portions of the workpiece imaged by flashlamp radiation that passes through voids in the ink formation. It is thought that the decreased concentration of thermal energy in the workpiece caused by diffusion of the energy in the workpiece decreases both the number and size of pinholes imaged in the coating by the flashlamp. Other potential explanations for diminished pinhole imaging associated with the flashlamp include elevated radiation divergence of the flashlamp and decreased directional uniformity of flashlamp rays.

In one embodiment, as in FIG. 1, a buffer layer 20 is positioned proximate the coating or boundary portion of the workpiece 14. It is known that ablation of the pattern 13 in the coating or boundary portion leads to high energy fragmentation of debris, and it is believed that the fragments of debris travel on the order of one or two centimeters from the workpiece 14 absent the buffer layer 20. The buffer layer 20 acts as a physical, impermeable barrier that prevents movement of debris away from the workpiece 14, and thus prevents debris from contacting the template 16, such as the mask 18.

The buffer layer 20 is located close enough to the coating or boundary portion of the workpiece 14, it is believed, to prevent movement of debris more than a few millimeters away from the workpiece 14. If the buffer layer 20 were not present, it is known that debris would contact and adhere to the mask 18 within the windows. Cleaning of the debris from the mask 18 or replacement of the mask 18 would be needed to prevent dispersion and diffraction of the radiation and undesirable imaging effects. Debris cleaning is disruptive and mask 18 replacement is expensive.

When used with the ink formation, the buffer layer 20 acts as a physical, impermeable barrier that prevents movement of the debris away from the workpiece 14, and thus prevents debris from contacting the flashlamp 12. The ink formation is positioned between the buffer layer 20 and the workpiece 14 if the ink formation is applied directly to the coating or boundary portion. Otherwise, the buffer layer 20 is positioned between the ink formation and the workpiece 14. If the buffer layer 20 were not present, it is known that debris would contact and adhere to the flashlamp 12. Cleaning of debris from the flashlamp 12 or replacement of the flashlamp 12 would be needed to prevent dispersion and diffraction of the radiation and undesirable imaging effects. Debris cleaning is disruptive to production, and flashlamp 12 replacement is expensive.

In one embodiment, as in FIG. 2, the substrate of the workpiece 14 is the buffer layer 20. A coated side (not shown) of the substrate includes the coating. The substrate also includes a non-coated side (not shown). The coated and non-coated sides oppose each other. The flashlamp 12 is located on the non-coated side of the substrate. The radiation of the flashlamp 12 enters the non-coated side of the substrate and passes through the substrate. The radiation contacts the coating on a side of the coating that is in contact with the substrate and creates the pattern 13 in the coating of the workpiece 14.

In more preferred embodiments, the buffer layer 20 is either a sheet of film 22, as in FIG. 1, or a web of film (not shown) positioned to isolate the coating or boundary portion from the flashlamp 12. All comments about the buffer layer 20 apply to the sheet of film 22, the web of film, and the substrate (when the substrate is the buffer layer 20), unless otherwise indicated. The buffer layer 20 is durable enough to provide adequate handling characteristics and strong enough to prevent passage of debris liberated from the workpiece 14.

It is generally desirable to place the buffer layer 20 proximate the coating or the boundary portion such that the flashlamp 12 may be placed close to the workpiece 14. Close spacing of the flashlamp 12 to the workpiece 14 may produce more favorable imaging economics and improved pattern characteristics. Close spacing also limits contamination of non-imaged portions of the workpiece 14 located outside the pattern 13.

However, the degree of close contact desired between the buffer layer 20 and the coating or the boundary portion may depend upon workpiece variables, such as the roughness of the coating or the boundary portion of the workpiece 14. For example, some coatings have rougher surfaces than other coatings. It is believed that if the buffer layer 20 is in intimate contact with a rough surface such that the buffer layer 20 conforms to the rough surface, the pattern 13 created by the radiation will likely have somewhat poorer resolution. It is believed that the poorer resolution will arise due to dispersion and diffraction effects created when the radiation passes through the buffer layer 20 at other than a substantially perpendicular orientation, relative to the buffer layer 20.

Close spacing of the buffer layer 20 and the coating is inherently present when the substrate is the buffer layer 20. Otherwise, referring to FIG. 1, close spacing of the buffer layer 20 and the coating or the boundary portion may be obtained by laying the buffer layer 20 against the coating or the boundary portion of the workpiece 14 such that the buffer layer 20 and the workpiece 14 are in fixed contact with each other. Also, the buffer layer 20, such as the sheet of film, may be laminated or extruded onto the coating or the boundary portion using conventional lamination or extrusion techniques and equipment.

In another alternative, the coating or boundary portion and the buffer layer 20 may be placed in dynamic relationship using a continuous staging system such that the buffer layer 20 and the coating or the boundary portion each move at the same speed and in the same direction and are in contact with each other, but are not fixed to each other. Here, the workpiece 14 takes the form of a workpiece web (not shown) and the buffer layer 20 takes the form of a buffer web (not shown).

The buffer layer 20 is preferably selected to assure optimum image shaping in the coating or the boundary portion of the workpiece 14 and efficient use of the radiation. The radiation desired at the coating or the boundary portion to create the pattern 13 depends heavily on the absorption characteristics of the coating or the boundary portion of the workpiece 14. The radiation actually reaching the coating or the boundary portion depends on the transmittance of the radiation through the buffer layer 20. A higher transmittance through the buffer layer 20 decreases the energy requirements of the flashlamp 12 and decreases absorptive heating of the buffer layer 20. The transmittance of the buffer layer 20 is highly dependant upon the material the buffer layer 20 is made of and the thickness of the buffer layer 20.

The buffer layer 20 is sufficiently transparent to the radiation of the flashlamp 12 such that the radiation, after passing through the buffer layer 20, has sufficient remaining energy to form the pattern 13 in the coating or the boundary portion of the workpiece 14. The buffer layer 20 is preferably highly transparent to the radiation such that the flashlamp 12 efficiently develops the pattern 13 in the coating or the boundary portion. Preferably, the buffer layer 20 is sufficiently transparent to the radiation to allow at least about fifty percent (50%), and more preferably at least about eighty percent (80%), of the radiation to pass through the buffer layer 20.

The buffer layer 20 is also selected to assure optimum image shaping in the coating or the boundary portion. Image shaping depends on the geometric changes in the radiation, such as scattering and diffraction of the radiation, due to passage of the radiation through the buffer layer 20. The geometric changes in the radiation are created by manufacturing defects, such as extrusion lines, surface irregularities, and caliper non-uniformity. Preferably, the buffer layer 20 has minimal manufacturing defects and is of sufficient quality to produce good image resolution in the coating or the boundary portion.

The transmittance of the buffer layer 20 and the geometric changes imposed upon the radiation depend upon the material the buffer layer 20 is made of, the thickness of the buffer layer 20, and manufacturing defects present in the buffer layer 16. It has been discovered that some organic polymer films, such as particular grades of polypropylene film, are particularly conducive to optimum image shaping and efficient use of radiation from the flashlamp 12, under certain circumstances.

The buffer layer 20, preferably the sheet of film, may be made of a commercial grade of polymer film, such as commercial grade polypropylene and commercial grade polyethylene. However, commercial grades of polymer film are not the film of choice because commercial grades of polymer film typically have manufacturing defects, such as extrusion lines, surface irregularities and caliper non-uniformity. These defects typically introduce irregularities into the radiation as the radiation passes through the sheet of film. Additionally, commercial grades of polymer films with these defects tend to absorb energy from the radiation. This causes the film to heat up and may decrease the durability and useful life of the polymer film.

If commercial grade polymers are nonetheless selected, it has been found that commercial grade polyethylene, relative to commercial grade polypropylene, is significantly less transparent to some wavelength bands of interest. Correspondingly, the power supplied to the flashlamp 12 for creating an identical pattern in an identical workpiece 14 is increased for a particular flashlamp 12 emitting radiation through commercial grade polyethylene film as compared to a similar flashlamp 12 emitting radiation through commercial grade polypropylene film.

Preferably, the buffer layer 20 is made of capacitor grade biaxially-oriented polypropylene (BOPP). It has been found that capacitor grade polypropylene provides a high transmittance to radiation of the flashlamp 12. Additionally, the capacitor grade polypropylene has a smooth finish, uniform thickness, and minimal surface imperfections, such as casting marks. These qualities minimize changes in radiation geometry as the radiation passes through the sheet of film, thereby preserving pattern resolution and extending film life.

After the pattern 13 is created in the coating or boundary portion, the buffer layer 20 is removed from the workpiece 14. Significant amounts of debris are typically removed with the sheet of film when the buffer layer 20 is made of biaxially-oriented polypropylene film. The coating or boundary portion is then cleaned of remaining debris using a conventional carbon dioxide snow blasting process. According to the snow blasting process, carbon dioxide at approximately 850 PSI (59.76 kg/cm$^2$) is mixed with ambient air to produce crystallized snow granules. The crystallized snow granules are projected at the coating or the boundary portion of the workpiece 14 in "sand blast" fashion using a commercially available blasting gun.

Although many embodiments may be practiced in accordance with this invention, the invention is demonstrated by the following illustrative but nonlimiting examples.

EXAMPLES

Examples 1–2

Flashlamp Ablation of A Metal-Coated Substrate

The workpiece 14 of each example, referring to FIG. 1, was a vacuum metalized polymer film made by evaporating a 75 nm coating of copper onto a polyethylene terephthalate (PET) substrate using a standard E-beam evaporation technique within a vacuum chamber. The buffer layer 20 was made of capacitor grade biaxially oriented polypropylene film available from Bollmet Inc., of Dayville, Conn. The buffer layer 20 was 0.001 inches (25 µm) thick.

The flashlamp 12 was a Part No. ILCT-18 linear flashlamp available from ILC Technology, Inc. of Sunnyvale, Calif. The flashlamp 12 included a transparent fused silica tube with a wall thickness of 1.0 mm and a 6.0 mm diameter bore. The bore contained pressurized xenon at a gauge pressure of 400 mm of Hg (0° C.). The flashlamp 12 had a pulse width of 6 µseconds (FWHM) with input energy of 100 joules. A charging voltage of about 10 kv was applied to a capacitor with about 2 µF of capacitance to pulse the flashlamp 12. A simmer current of about 1.7 amps was applied to the electrodes of the flashlamp 12 to keep the plasma warm and prevent thermal shock to the flashlamp 12. Radiation from the flashlamp 12 was directed by the reflector 15, which was elliptically shaped, toward a portion of the workpiece 14 with an area of about 44.5 cm$^2$. The reflector aperture was 5.0 cm wide and the flashlamp arc was 8.9 cm long.

Example 1

The ink formation was printed on the copper coating of the workpiece 14 by a conventional technique prior to flashlamp 12 exposure. The pattern 13 was a series of about 30 parallel rows of lines. Each row of lines included lines ranging in width from 0.002 inches (50 µm) to 0.010 inches (250 µm). The buffer layer 20 was placed over the ink formation in close contact with the ink formation and the copper coating. An area of about 14 cm$^2$ of the targeted 44.5 cm$^2$ area was ablated when the flashlamp was pulsed. This 14 cm$^2$ area included good resolution for lines as small as 0.004 inches (100 µm) wide with 0.002 inch (50 µm) line-to-line spacing. Additionally, the buffer layer 20 prevented ablation debris from dirtying the flashlamp 12 and the reflector 15.

Example 2

The buffer layer 20 was placed over the workpiece 14 in close contact with the copper coating. The mask 18 with the guide shape was placed in close contact with the buffer layer 20. The base material of the mask 18 was made of fused silica and the surface coating material was aluminum. The aluminum was vacuum deposited on the fused silica base material to a depth of approximately 600 nm. The aluminum was shaped to form the guide shape in the mask 18 by standard semiconductor industry photolithographic and wet etch processing techniques.

The pattern 13 was a series of about 30 parallel rows of lines. Each row of lines included lines ranging in width from 0.002 inches (50 µm) to 0.010 inches (250 µm). An area of about 14 cm$^2$ of the targeted 44.5 cm$^2$ area was ablated. This 14 cm$^2$ area included good resolution for lines as small as 0.006 inches (150 µm) wide with 0.003 inch (75 µm) line to line spacing. Also, the buffer layer 20 prevented ablation debris from contacting and dirtying the mask 18, the flashlamp 12, and the reflector 15.

Example 3

The workpiece 14 of this example was substantially the workpiece described for Examples 1 and 2. The template 16 was the ink formation formed of a conventional organic ink and printed on the copper coating of the workpiece 14 by a conventional technique. The guide pattern of the ink formation included 0.004 inch (100 µm) wide lines with 0.008 inch (200 µm) center to center spacing. The buffer layer 20 was made of capacitor grade biaxially oriented polypropylene film available from Bollmet Inc., of Dayville, Conn. The buffer layer 20 was 0.001 inches (25 µm) thick.

The flashlamp 12 was a Model No. L786E linear flashlamp available from ILC Technology, Inc. of Sunnyvale, Calif. The flashlamp 12 included a transparent fused silica tube with a wall thickness of 1.0 mm and a 8.0 mm diameter bore. The bore contained pressurized xenon at a gauge pressure of 400 mm of Hg (0° C.). The flashlamp 12 had a pulse width of 4 µseconds (FWHM) with input energy of 200 joules and ablated about 60 square centimeters per pulse.

A charging voltage of about 21.8 kv was applied to a capacitor with about 0.84 µF of capacitance to pulse the flashlamp 12. A simmer current of about 1.9 amps was applied to the electrodes of the flashlamp 12. Radiation from the flashlamp 12 was directed by the reflector 15, which had a cusp shape, toward a portion of the workpiece 14. The reflector aperture was 5.0 cm wide and the flashlamp arc was 20.3 cm long. The flashlamp 12 produced an energy density of 1.5 J/cm$^2$ at the workpiece 14.

Figure 5:
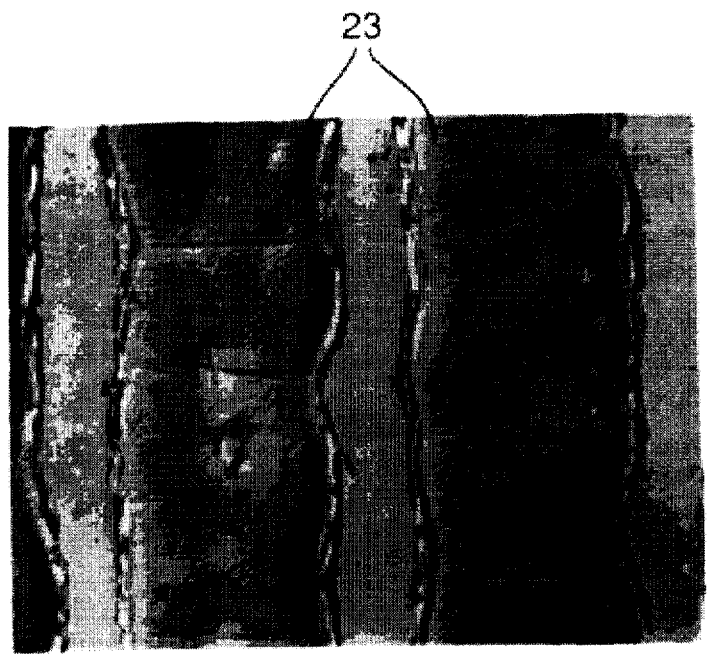
FIG. 5 is a magnified top plan view of a portion of the pattern of FIG. 3.

(In FIGS. 3 and 5, light colored areas are areas where coating was ablated, and dark colored areas are areas where coating was not ablated). (Also, FIG. 3 is magnified about 12.5 times and FIG. 5 is magnified about 200 times).

The flashlamp 12 generated a pattern of lines 23 in the workpiece 14 as in FIG. 3. The flashlamp 12 ablated the pattern of lines 23 with acceptable, reduced resolution, as compared to the laser of Comparison Example 1. It is believed that lower energy density per unit time associated with the flashlamp 12 was responsible for the reduced resolution.

Each pulse of the flashlamp 12 also created the narrow region (not shown) of damaged material in the coating. The area of damaged material created by each pulse of the laser of Comparison Example 1, as a percentage of the coating ablated, was several times larger than that created by each pulse of the flashlamp 12.

Comparison Example 1

The workpiece 14, template 16, and buffer layer 20 of this example were substantially the same as the workpiece 14, template 16, and buffer layer 20 of Example 3. A laser (not shown) was substituted in place of the flashlamp 12 and the reflector 15.

The laser was a Model LPX 315 150 Watt Excimer Laser available from Lambda Physik of Acton, Mass. The Model LPX 315 laser was capable of selective beam energy output ranging from 400 to 800 mJ at up to a 150 Hz pulse rate. The laser had a pulse width of 0.02 microseconds (FWHM) and ablated in the range of 2 to 3 square centimeters per pulse. The excimer Laser was optimized for fluorine and produced ultraviolet radiation with a wave length of 248 nm. A cylindrical converging lens with a 42 inch (106.68 cm) focal length and a cylindrical diverging lens with a 6 inch (15.24 cm) focal length were arranged to focus and shape the beam of the laser. The distances between the converging lens and the laser and between the converging lens and the diverging lens were adjusted to provide the combination of beam width, height, and energy density required for ablation of the copper coating.

The workpiece 14 was mounted on an X-Y translation stage that was translated through the laser beam to scan the guide shape of the ink formation to create the pattern in the copper coating. The X-Y translation stage was translated in the Y direction at a linear rate of 100 inches/min (254 cm/min). The laser produced an energy density of 125 mJ/cm$^2$ at the workpiece 14. The energy density was measured by an apertured Model ED-500 Joulemeter available from Gentech of Ste-Fog, Quebec, Canada. The meter was placed the same distance from the laser as existed between the laser and the workpiece 14.

Figure 4:
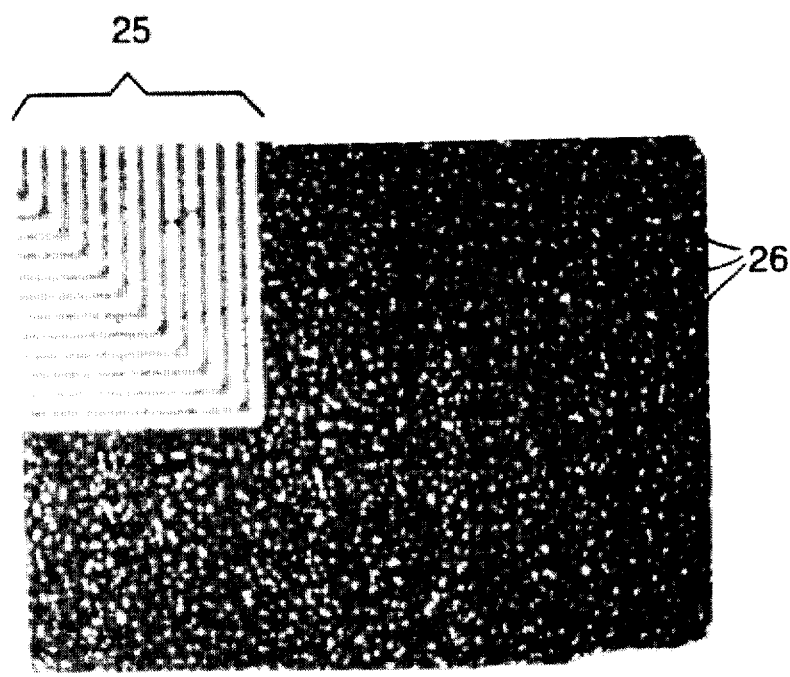
FIG. 4 is a magnified top plan view of a pattern imaged by a laser.
Figure 6:
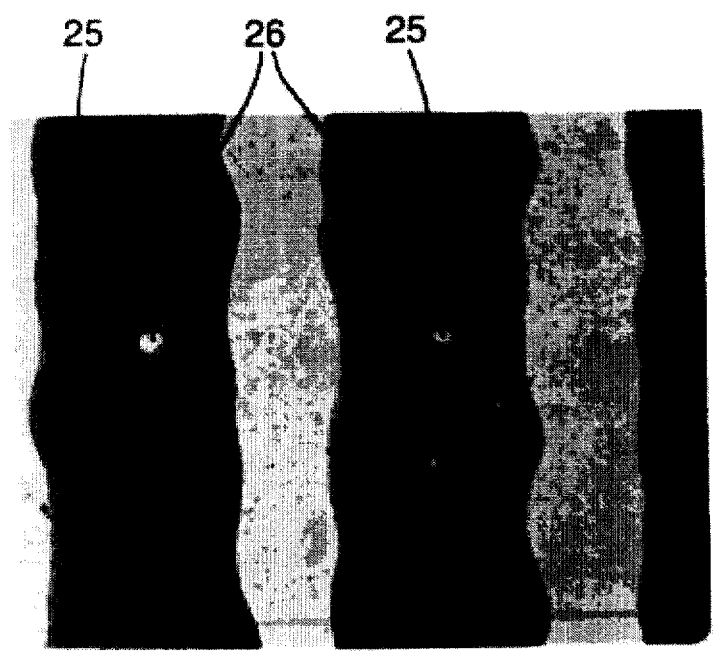
FIG. 6 is a magnified top plan view of a portion of the pattern of FIG. 4.

(In FIGS. 4 and 6, light colored areas are areas where coating was ablated, and dark colored areas are areas where coating was not ablated). (Also, FIG. 4 is magnified about 12.5 times and FIG. 6 is magnified about 200 times).

The laser generated a pattern of lines 25 in the workpiece 14 as in FIG. 4. The laser ablated the pattern of lines 25 with good resolution and also ablated pinholes 26 where the ink formation covered the workpiece 14. The pinholes 26, as compared to the pinholes 24 ablated by the flashlamp 12 in Example 3, are significantly larger in size and greater in number. The pinholes 26 in the metal coating, more clearly shown in FIG. 6, are more likely to create a circuit path open than are the pinholes 24 formed by the flashlamp 12 due to the larger size and increased number of the pinholes 26 relative to the pinholes 24.

During each pulse, the laser created the narrow region (not shown) of damaged material in the coating proximate the coating that was ablated. The area of damaged material created per pulse of the laser, as a percentage of the coating ablated, was several times larger than that created by each pulse of the flashlamp 12 in Example 3.

Although the present invention has been described with reference to preferred embodiments, workers skilled in the art will recognize that changes may be made in form and detail without departing from the spirit and scope of the invention.

What is claimed is:

1. A method of creating a shaped image in a workpiece using a flashlamp, the method comprising:
   positioning a template proximate the workpiece;
   directing radiation emitted by the flashlamp during a short pulse of approximately 100 μsec or less through the template toward the workpiece, the radiation capable of moving debris away from the workpiece.

2. The method of claim 1 wherein the wavelength of the radiation is less than about 800 nm.

3. The method of claim 1 wherein the wavelength of the radiation ranges between about 200 nm and 800 nm.

4. The method of claim 1 and further comprising varying power input to the flashlamp to vary the wavelength of the radiation.

5. The method of claim 1 and further comprising placing an optical filter between the flashlamp and the workpiece such that the radiation passes through the optical filter, select wavelengths of the radiation not passing through the filter.

6. The method of claim 1 and further comprising applying a absorption enhancing agent to the workpiece.

7. The method of claim 1 wherein the flashlamp comprises a linear flashlamp with a tubular lamp body containing xenon.

8. The method of claim 1, the method further comprising positioning a layer proximate the template to prevent debris from the workpiece from dispersing, the layer disposed such that the radiation from the flashlamp passes through the layer before forming the pattern in the workpiece, and the layer permitting sufficient radiation transmission such that the flashlamp is capable of forming the shaped image.

9. The method of claim 8 wherein the workpiece comprises a substrate with a coating, the layer comprises the substrate, and the pattern is formed in the coating.

10. The method of claim 8 wherein the layer permits at least about eighty percent (80%) transmission of the radiation.

11. The method of claim 8 wherein the layer is made of polypropylene, polyethylene, polycarbonate, or polymethylmethacrylate.

12. The method of claim 1 wherein the workpiece comprises a substrate with a coating of metal.

13. The method of claim 12 wherein the substrate comprises a homogeneous polymer selected from the group consisting of polyester, polyethylene terephthalate, and polyimide.

14. The method of claim 13 wherein the workpiece comprises a substrate coated with magnetic material, the substrate made of polyethylene terephthalate.

15. The method of claim 12 wherein the coating is made of a magnetic metal.

16. The method of claim 12 wherein the coating is made of a conductive metal.

17. A method of creating a shaped image in a workpiece using a broadband light source, the method comprising:
    positioning a template proximate the workpiece;
    directing radiation emitted by the light source during a short pulse of approximately 100 μsec or less through the template toward the workpiece, the radiation capable of moving debris away from the workpiece.

18. The method of claim 17 wherein the wavelength of the radiation ranges between about 200 nm and 800 nm.

19. A system for creating a shaped image in a workpiece, the system comprising:
    a template located proximate the workpiece and
    a linear flashlamp located proximate the template, the flashlamp emitting radiation with a wavelength of less than about 800 nm during a short pulse of approximately 100 μsec or less, the radiation directed through the template toward the workpiece, the radiation capable of moving debris away from the workpiece.

20. The system of claim 19 wherein the wavelength of the radiation ranges between about 200 nm and 800 nm.

21. The system of claim 19 wherein power input to the flashlamp is capable of being varied to change the wavelength of the radiation.

22. The system of claim 19 and further comprising an optical filter placed between the flashlamp and the workpiece such that the radiation passes through the optical filter, select wavelengths of the radiation not passing through the filter.

23. The system of claim 19 and further comprising a layer positioned proximate the template to prevent debris from the workpiece from dispersing, the layer disposed such that the radiation from the flashlamp passes through the layer before forming the pattern in the workpiece, and the layer permitting sufficient radiation transmission such that the flashlamp is capable of forming the shaped image.

24. The system of claim 23 wherein the layer permits at least about eighty percent (80%) transmission of the radiation.

25. The system of claim 19 wherein the workpiece comprises a substrate with a coating of metal.

26. The system of claim 25 wherein the substrate comprises a homogeneous polymer selected from the group consisting of polyester, polyethylene terephthalate, and polyimide.

27. The system of claim 25 wherein the coating is made of a magnetic metal.

28. The system of claim 25 wherein the coating is made of a conductive metal.

29. The system of claim 19 wherein the workpiece comprises a substrate coated with magnetic material, the substrate made of polyethylene terephthalate.

* * * * *